(12) United States Patent
Shie et al.

(10) Patent No.: US 7,333,684 B2
(45) Date of Patent: Feb. 19, 2008

(54) STACK-INTEGRATED PACKAGE OF OPTICAL TRANSCEIVER FOR SINGLE CORE FULL DUPLEX FIBER COMMUNICATIONS

(75) Inventors: Jin Shown Shie, Hsinchu (TW); Rongnan Huang, Kaohsiung (TW)

(73) Assignee: Integrated Crystal Technology Incorporated (TW)

( * ) Notice: Subject to any disclaimer, the term of this patent is extended or adjusted under 35 U.S.C. 154(b) by 781 days.

(21) Appl. No.: 10/810,458

(22) Filed: Mar. 25, 2004

(65) Prior Publication Data
US 2005/0213983 A1 Sep. 29, 2005

(51) Int. Cl.
G02B 6/02 (2006.01)
G02B 6/12 (2006.01)
G02B 6/32 (2006.01)

(52) U.S. Cl. ............................. 385/15; 385/14; 385/33
(58) Field of Classification Search ................ 385/14, 385/15, 33
See application file for complete search history.

(56) References Cited

U.S. PATENT DOCUMENTS 5,679,947 A * 10/1997 Doi et al. ................ 250/201.5
5,809,050 A * 9/1998 Baldwin et al. .......... 372/50.21
5,978,401 A * 11/1999 Morgan .................... 372/50.21
6,195,485 B1 * 2/2001 Coldren et al. ............... 385/49
6,574,398 B2 * 6/2003 Coldren et al. ............... 385/49
2002/0009258 A1 * 1/2002 Coldren et al. ............... 385/24
2004/0080011 A1 * 4/2004 Starikov et al. ............. 257/481

* cited by examiner

Primary Examiner—K. Cyrus Kianni
(74) Attorney, Agent, or Firm—Perkins Coie LLP

(57) ABSTRACT

This invention relates to a novel stack-integration package of a light emitter and a photodetector in a high speed, full duplex optical transceiver for fiber communications. The structure is comprised of a photodetector chip, having an isolated micromachined cavity on the chip surface, and a light emitter chip, stacked on the bottom surface inside that cavity, so that a stack-integrated embodiment of light detector and emitter capable of performing full duplex optical communication is resulted. Said cavity surface in the photodetector is coated with reflective metal to prevent direct optical crosstalk from the emitter to the photodetector. Said light emitter means either LED (light emitting diode) or LD (laser diode).

The present invention is further characterized by having a transparent encapsulation over the stack-integrated embodiment with a specific surface contour that minimizes the Fresnel reflection at the encapsulation-air interface and its associated crosstalk aftereffect. Such packaging structure is particularly suitable as a component for the purpose of single-core, full-duplex optical fiber communications.

5 Claims, 6 Drawing Sheets

STACK-INTEGRATED PACKAGE OF OPTICAL TRANSCEIVER FOR SINGLE CORE FULL DUPLEX FIBER COMMUNICATIONS

BACKGROUND OF THE INVENTION

1. Field of the Invention

The present invention relates to a single-core full-duplex transceiver structure. In particular, the present invention relates to a novel stack-integration package of a light emitter and a photodetector in a high speed, full duplex optical transceiver for fiber communications.

2. Description of the Related Art

Modern optical communications demand large quantity of high-speed photo-detectors and light emitting devices as the essential optical emitting and receiving components. In optical fiber communication links, a transmitter is the electrical to optical (E-O) converter, which is generally comprised of an LD (Laser Diode) or LED (Light Emitting Diode) and a driver IC as a package in a connector form while a receiver is an O-E converter comprising a PD (photodiode) and a signal processing IC packaged also in the same connector form for user friendly applications. An optical fiber that is fitted with a transmitter connector on one end and a compatible receiver connector on the other offers a unidirectional digital optical data communication link in what is called single-core, simplex optical transmission. For bi-directional communication, two unidirectional digital optical data communication links are required, one for each direction. In this configuration, the transmitter and receiver connectors are two separate housings and two separate optical fiber cores are deployed, one for each direction.

However, for cost saving, it is desirable to use a single core of fiber and a single transceiver connector on each end for bi-directional transmission. The present invention is an innovation in the making of such a bi-directional transceiver that allows bi-directional optical data transmission over a single core of fiber using one single transceiver housing on each end.

There are many prior arts related to single-core full-duplex transceiver structure, such as U.S. Pat. Nos. 6,353,491, 6,236,477, 6,188,495, 5,157,760, 6,097,521, 5,967,622, 5,555,334, 5,416,624, 5,408,559, 5,127,075, etc. All these methods are structurally complex involving sophisticated fiber branching (FIG. 1), beam splitting (FIG. 2) or other techniques. FIG. 1 illustrates the fiber branching method disclosed in U.S. Pat. No. 6,157,760, where 1×2 branching fibers are used so that outgoing light from the emitter is guided by the branch fiber into the trunk fiber while incoming light from the fiber goes straight through the trunk fiber onto the photo-detector. FIG. 2 depicts the beam splitting method disclosed in U.S. Pat. No. 6,353,491 where optical a beam splitter is used so that outgoing light from the emitter is reflected by the splitter into the fiber, while incoming light from the fiber is transmitted straight through the splitter onto the photo-detector. These prior arts preclude collocation of the emitter and the photo-detector chips and require sophisticated precision packaging processes, making them difficult and expensive to make and unreliable to use. The present invention provides a simplified packaging method that saves drastically in both space and cost.

OBJECTS OF THE INVENTION

It is therefore an object of the invention to provide a stack-integrated optical transceiver, by using a stack-integration package structure of a light emitter and a photodetector for high speed, full duplex optical fiber communication, It is another object of the invention to provide a stack-integrated optical transceiver, by using an optically clear encapsulation of specifically shaped lens surface is provided for light transmission from and to the stack-integrated hybrid chip, so that optical crosstalk from the emitter device to the photodiode device within the transceiver package is avoided or minimized.

DISCLOSURE OF THE INVENTION

In order to accomplish the above goals, a first aspect of the present invention teaches a stack-integrated optical transceiver that is characterized by a stack-integration package structure of a light emitter and a photodetector for high speed, full duplex optical fiber communication where said photodetector has on its upper surface an isolated, U-shaped cavity that is conformal-coated first with an electrically insulating layer and then with an optically reflective and electrically conducting metal layer. Said light emitter is stacked at the bottom inside the U-shaped cavity using conventional die bonding process to form with the photodetector a hybrid chip of stack-integrated embodiment. Said conformal coated metal layer serves multiple purposes at once. Not only does it provide for electrical interconnection from the bottom of the U-shaped cavity to a wire-bonding pad on the photodetector surface but it also prevents direct optical crosstalk from the light emitter to the detector and optimally reflects light from the emitter in the desired direction. In addition, the reflective cavity metal surface also provides a larger effective light emitting area and facilitates optical coupling to the connected fiber.

Another aspect of the present invention teaches a stack-integrated optical transceiver that is characterized by a stack-integration package structure of a light emitter and a photodetector for high speed, full duplex optical fiber communication where said photodetector has on its upper surface an isolated, U-shaped cavity that is conformal-coated first with an electrically insulating layer and then with an optically reflective and electrically conducting metal layer. Said light emitter is stacked at the bottom inside the U-shaped cavity using conventional die bonding process to form with the photodetector as a hybrid chip of stack-integrated embodiment. The stack-integrated hybrid chip is further characterized by a specific package whereby an optically clear encapsulation of specifically shaped lens surface is provided for light transmission from and to the stack-integrated hybrid chip, such that Fresnel reflection at the encapsulation-air interface reflects light from the emitter retrospectively back toward the emitter vicinity, so that optical crosstalk from the emitter device to the photodiode device within the transceiver package is avoided or minimized.

BRIEF DESCRIPTION OF THE DRAWINGS

The foregoing and other advantages of the invention will be more fully understood with reference to the description of the best embodiment and the drawing wherein.

DESCRIPTION OF THE PREFERRED EMBODIMENT

Figure 1:
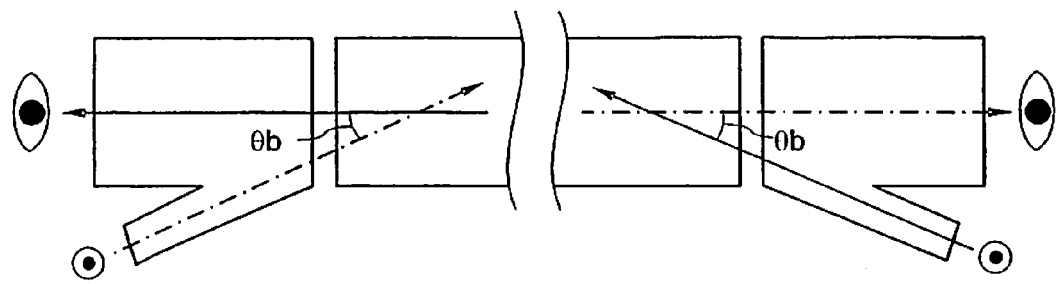
FIG. 1 is a priori art of single-core full-duplex optical fiber transceiver using 1×2 fiber branching for coupling.
Figure 2:
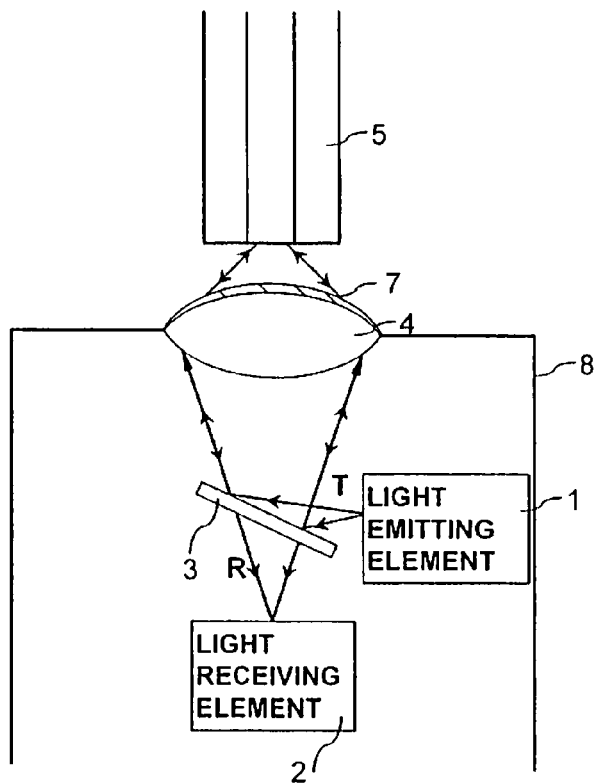
FIG. 2 is another prior art of single-core full-duplex fiber transceiver using optical beam splitter for coupling.
Figure 3:
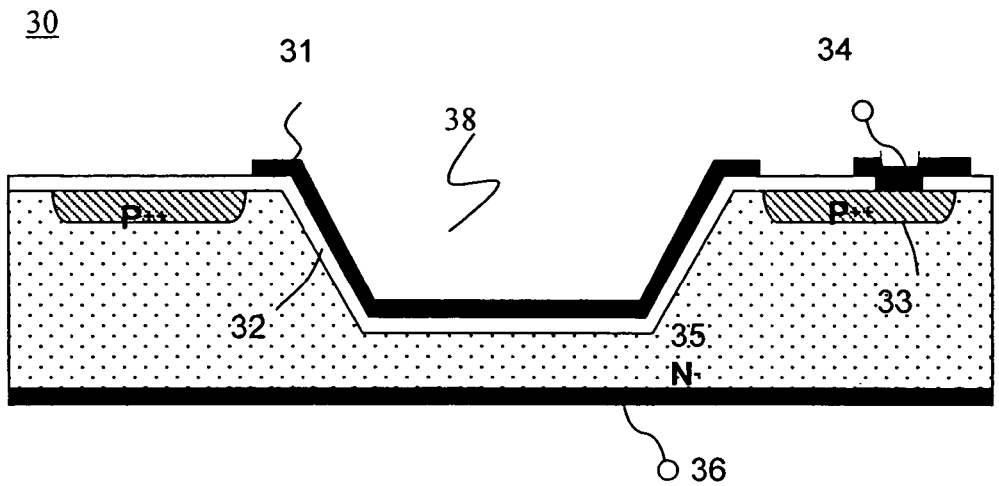
FIG. 3 is a structure of the photodetector chip in according to one embodiment of the present invention.

Referring to FIG. 3, a photodetector chip, or more specifically, a silicon photodiode 30, has a U-shaped cavity 38 that is surrounded by the optically active region, namely, the p-n junction area 33 of the photodiode 30. The cavity 38 can be formed using physical or chemical deep etching in semiconductor fabrication process deep to the substrate 35. After etching and cleaning, the surface of the cavity is coated by standard thermal oxidation 32 or other processes with an electrically insulating passivation first, then followed by a metal layer deposition on top. The metal layer is lithographically etched to a desired pattern, whereby the surface of the cavity is fully covered by cavity metal 31 so that it is reflective and opaque to light. This cavity metal layer 31 may also be connected to a bonding pad 34 on the upper surface of the photodetector for external wiring. A backside electrode 36 is deposited on the substrate 35.

Figure 4:
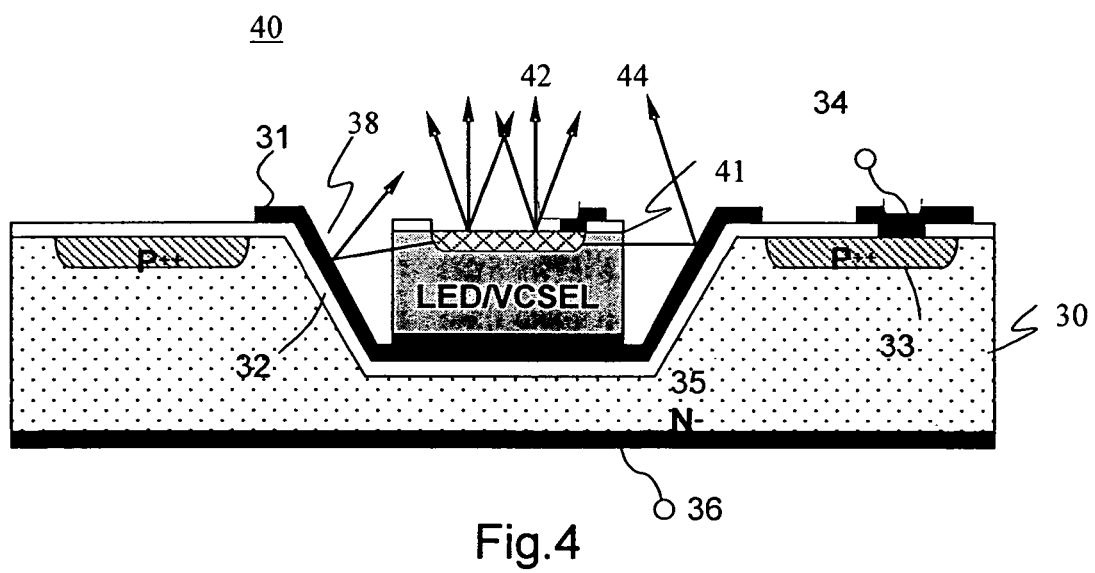
FIG. 4 is a stack-integrated package of a pair of photodetector and LED chips in according to another embodiment of the present invention.

As shown in FIG. 4, a light emitter chip 41, either an LED or a laser diode capable of emitting light vertically, is bonded to the surface at the bottom of the U shaped cavity 38 using conventional die bonding techniques, so that both the light emitter 41 and the photodiode 30 are stack-integrated into a hybrid chip embodiment 40. Upon proper wiring, the hybrid chip embodiment 40 provides the functionalities of both an emitter and a receiver simultaneously, namely, a transceiver. An advantage of this package is that light 42 from the stack-bonded LED or LD 41 cannot reach the photodetector directly due to the opaque property of the cavity metal 31 coated on the etched cavity surface 38. Another advantage is that the enlarged opening of the etched cavity 38 and the scattered light 44 from its reflective metal surface result in larger effective emitting area, which enhances the optical coupling efficiency between the emitter and the fiber. Although the U-shaped cavity 38 may be located anywhere on the photodetector chip 30, for optimal optical efficiency, it is best to be at the center location so that both the light emitter and the photodetector can be aligned to one same optical axis by design.

Figure 5:
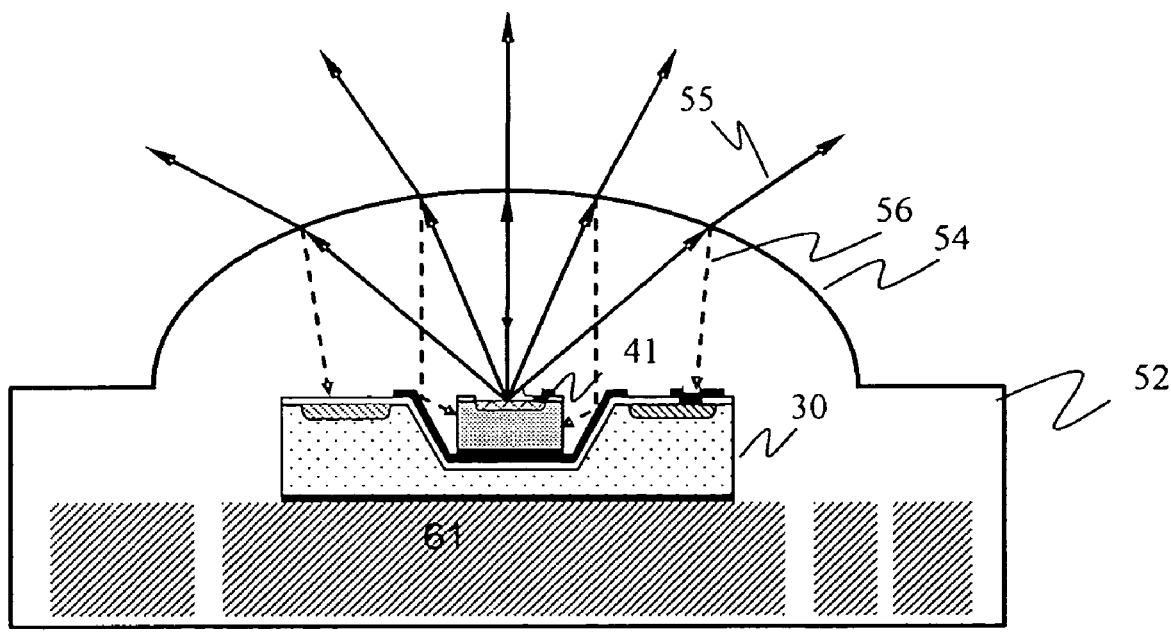
FIG. 5 illustrates the exemplary encapsulation of arbitrary shape of the stack-integrated hybrid transceiver chip by conventional lead frame package.
Figure 6:
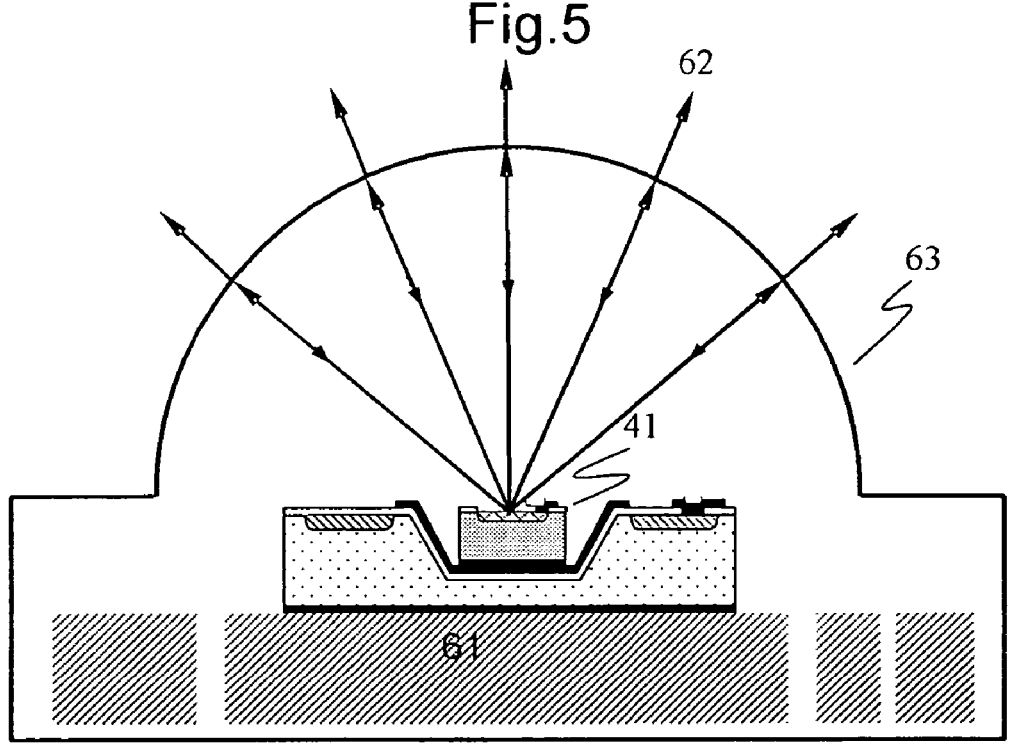
FIG. 6 illustrates the ray tracing of the emitter light of optically clear encapsulation having the shape of a hemispherical lens in according to one embodiment of the present invention.
Figure 7:
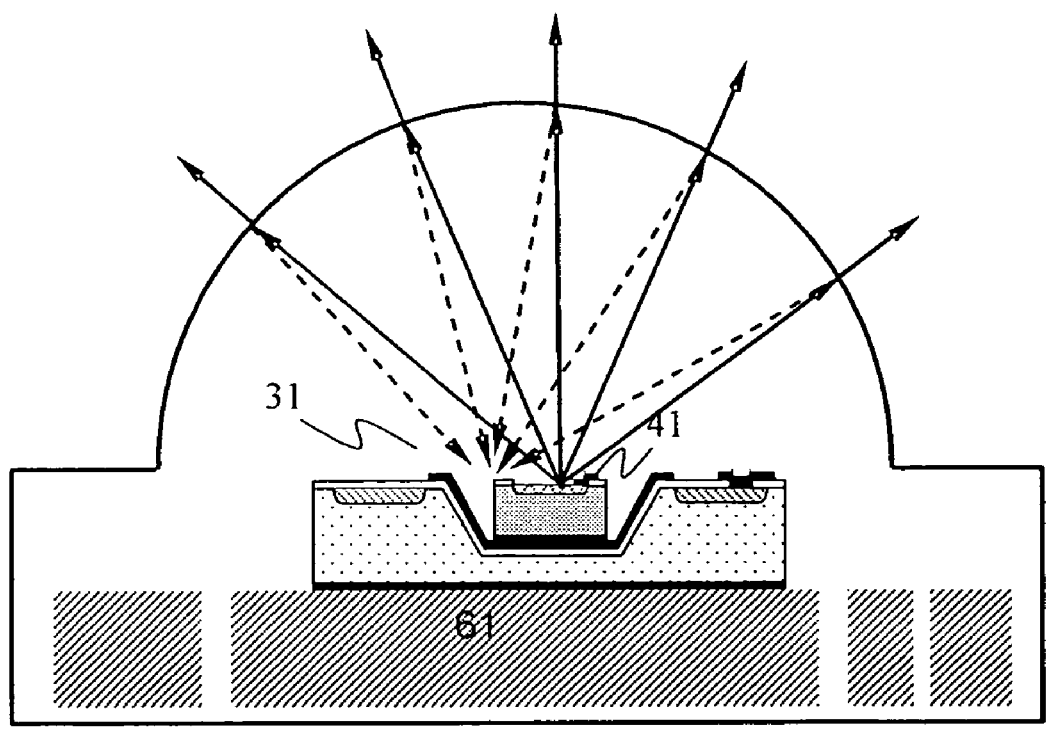
FIG. 7 illustrates the ray tracing of the emitter light of optically clear encapsulation having the shape of a hemispherical lens of the present invention when the light source emitter is off-centered.
Figure 8:
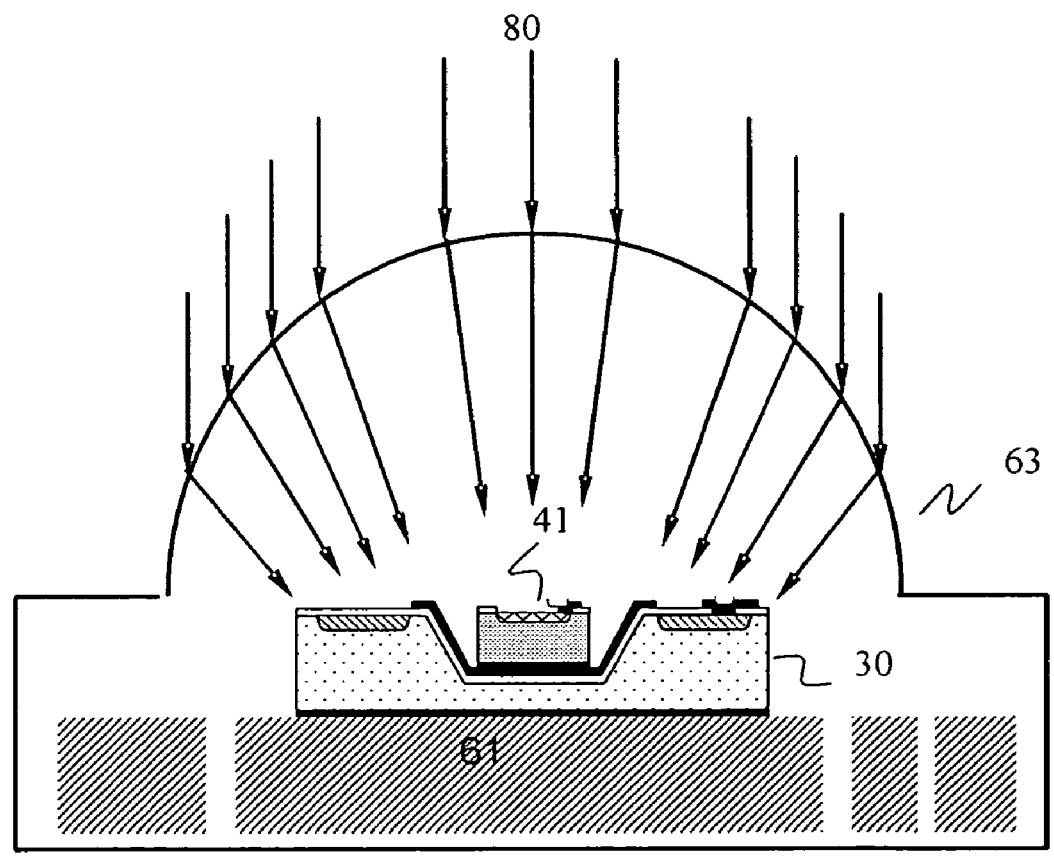
FIG. 8 illustrates the ray tracing of the incoming light of optically clear hemispherical encapsulation in according to one embodiment of the present invention.

The stack-integrated chip 40 is further processed into an encapsulated package. A common technique is to attach the hybrid chip 40 on lead frame substrate 61 with conventional automatic die-bonding machine and then with clear-type epoxy encapsulation 52 as that shown in FIG. 5. As shown also in the figure, a lens-shaped encapsulation 54 is used both for confining the outgoing light 55 from the emitter toward the optical fiber and for channeling the incoming light 80 (see FIG. 8) from the optical fiber to the photodetector 30. When the package is used as an optical transceiver, namely a transmitter as well as a receiver, it is notably demanding that light from the emitter does not stray onto the photodetector internally to avoid crosstalk within the transceiver module, as shown in FIG. 5 by rays 56 depicted in dotted lines. These rays 56 are caused by the difference in index of reflection across the encapsulation-air interface, which is known scientifically as Fresnel reflection. Epoxy encapsulation materials generally have an index of reflection close to 1.5, which means approximately 5% of the outgoing light from the emitter is reflected back at the encapsulation-air interface. Without proper design, the reflected light can fall upon the detector active area in the same package, resulting in internal crosstalk. In the present disclosure, this internal crosstalk effect can be minimized by a properly designed lens shape of the encapsulation as that exemplarily shown in FIG. 6. In FIG. 6, a hemispherical shape 63 is used for the encapsulation with the emitter chip 41 being placed at the spherical center. With such package configuration, a sufficient proportion of light rays 62 from the emitter are retrospectively reflected back to the origin due to the Fresnel reflection at the encapsulation-air interface, thereby reducing optical cross-coupling from the emitter 41 to the photodetector nearby. As shown in FIG. 7, due to the fact that practical emitter chips are not ideal point sources and that the emitter die 41 is not always perfectly positioned, there will always be rays that are not concentrically reflected back. However, the above-described opaque and reflective cavity metal layer 31 coated on the cavity surface greatly reduces optical crosstalk if its dimension is properly designed.

When the package behaves as a receiver, however, a major proportion of external lights 80 incident upon the encapsulation should be defocused onto the surrounding active areas of the photodetector and not be focused onto the emitter or its proximity. As that shown in FIG. 8, with the present exemplary hemispherical lens shape 63, the focal point is not at the emitter 41 based on optics theory since the focal length for refractive index of around 1.5 for epoxy or 1.46 for glass is longer than the radius of the encapsulation sphere. Hence external incident light rays 80 will be defocused and spread to the photodetector area surrounding the emitter in sufficient proportion for detection.

Also, due to the finite emitting area of the emitter chip 41 and the compact optical arrangement of the package, there are always other non-spherical shapes of the encapsulation aside from the hemispherical shape that can perform better con-focusing effect to minimize optical crosstalk. Present day ray-tracing techniques using commercial optical simulation tools can easily achieve the desirable tuning for the optimal encapsulation configuration. Therefore, the present invention claims all possible encapsulation shapes.

The encapsulation material is certainly not limited to clear-type epoxy only. All optically clear materials suitable for performing optical functions, such as glass, are included in the present invention.

Figure 9:
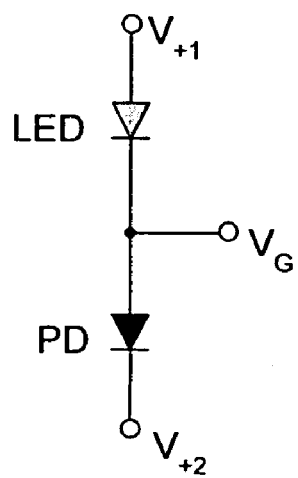
FIG. 9 shows a 3-terminal wiring diagram of the stack-integrated optical transceiver in according to one embodiment of the present invention.
Figure 10:
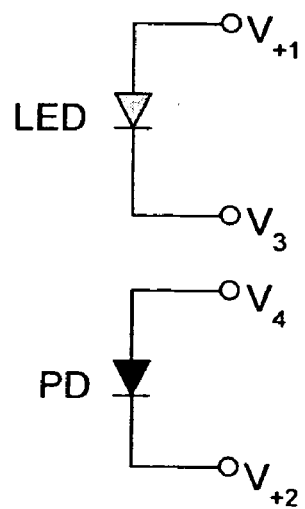
FIG. 10 shows a 4-terminal wiring diagram of the stack-integrated optical transceiver in according to one embodiment of the present invention.

The corresponding equivalent circuit of the packaged transceiver can be a 3-terminal or 4-terminal device as shown in FIG. 9 and FIG. 10, depending on the wiring pattern of the metal layer. One only notes that, in operation, a light emitter, LED or LD, is forward biased while a photodiode is generally zero or reverse-biased by external circuits.

Etching of the U-shaped groove as described in this disclosure can be accomplished easily by either conventional isotropic or anisotropic chemical etching well known in micro-fabrications. Anisotropic etching, also known as surface micromachining, can be applied on silicon wafer, usually in the (111) orientation, or on gallium arsenide wafer.

Figure 11:
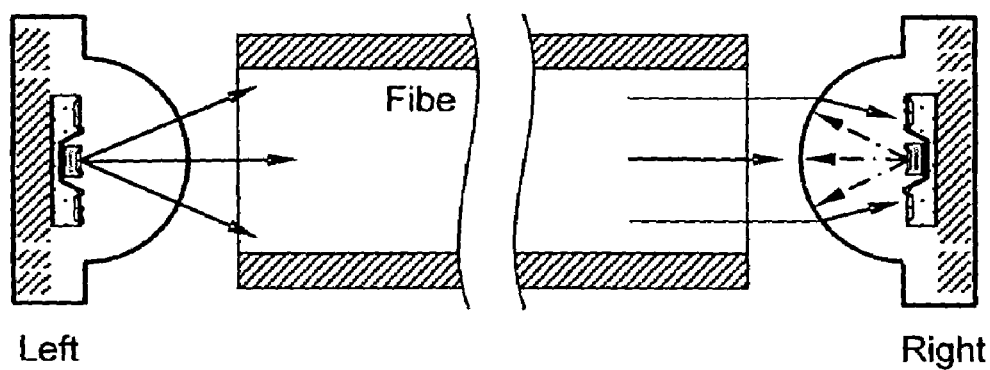
FIG. 11 shows the complete schematic diagram of single-core full-duplex optical transmission using the optical transceiver in according to one embodiment of the present invention.

By utilizing the above-described structures, a light emitter and a photodetector can be packaged into a compact optical transceiver element suitable for the purpose of full duplex data communication through a single-core optical fiber as that shown in FIG. 11.

Although specific embodiments of the invention have been disclosed, it will be understood by those having skill in the art that minor changes can be made to the form and details of the specific embodiments disclosed herein, without departing from the spirit and the scope of the invention. The embodiments presented above are for purposes of example only and are not to be taken to limit the scope of the appended claims.

What is claimed is:

1. A stack-integrated optical transceiver, by using a stack-integration package structure of a light emitting device and a photodetector for high speed, full duplex optical fiber communication, comprising:

a photodetector, has on its upper surface an isolated U-shaped cavity that is conformal-coated first with an electrically insulating layer and then with an optically reflective and electrically conducting metal layer;

a light emitting device, stacked at the bottom inside the U-shaped cavity using conventional die bonding process to form with the photodetector a hybrid chip of stack-integrated embodiment;

the conformal coated conducting metal layer, serves multiple purposes at once; providing for electrical interconnection from the bottom of the U-shaped cavity to a wire-bonding pad on the photodetector surface and form a reflective cavity metal surface for preventing direct optical crosstalk from the light emitter to the detector and optimally reflects light from the emitter in the desired direction;

said reflective cavity metal surface also provides a larger effective light emitting area and facilitates optical coupling to the connected fiber.

2. A stack-integrated optical transceiver as recited in claim 1, wherein said die bonding of the light emitting device inside the cavity in the photodetector can be electrically conductive to said conformal coated metal layer, resulting in a 3-terminal stack-integrated transceiver package, or said die bonding can be electrically non-conductive so that the whole embodiment of the stack-integrated hybrid chip forms a 4-terminal transceiver package where the emitter and the detector are electrically isolated completely.

3. A stack-integrated optical transceiver as recited in claim 1, wherein said photodetector is fabricated on Silicon or Gallium Arsenic substrate.

4. A stack-integrated optical transceiver as recited in claim 1, wherein said photodetector means semiconductor photodiodes.

5. A stack-integrated optical transceiver as recited in claim 1, wherein said light emitting device means laser diode, specifically vertical emitting laser diode, or light emitting diode.

* * * * *